(12) United States Patent
Oomori

(10) Patent No.: US 8,554,072 B2
(45) Date of Patent: Oct. 8, 2013

(54) OPTICAL TRANSCEIVER INCLUDING A PLURALITY OF TRANSMITTER UNITS AND A PROCESS TO CONTROL THE SAME

(75) Inventor: Hirotaka Oomori, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 223 days.

(21) Appl. No.: 12/898,956

(22) Filed: Oct. 6, 2010

(65) Prior Publication Data

US 2011/0085793 A1 Apr. 14, 2011

(30) Foreign Application Priority Data

Oct. 9, 2009 (JP) .................................. 2009-235642

(51) Int. Cl.
- *H04B 17/00* (2006.01)
- *H04B 10/00* (2013.01)

(52) U.S. Cl.
USPC .............. 398/22; 398/135; 398/137; 398/162

(58) Field of Classification Search
USPC .......................................................... 398/22
See application file for complete search history.

(56) References Cited

U.S. PATENT DOCUMENTS

| | | | | |
|---|---|---|---|---|
| 4,355,395 A * | 10/1982 | Salter et al. | ............. | 372/29.012 |
| 5,127,020 A * | 6/1992 | Kurihara | .................... | 375/151 |
| 5,337,323 A * | 8/1994 | Rokugawa et al. | ............. | 372/31 |
| 6,091,747 A * | 7/2000 | Morita et al. | ............. | 372/38.02 |
| 6,108,119 A * | 8/2000 | Devenport et al. | ............. | 359/248 |
| 6,137,522 A * | 10/2000 | Melino et al. | ................. | 347/233 |
| 6,870,864 B2 * | 3/2005 | Baumgartner | ............ | 372/29.021 |
| 6,897,424 B2 * | 5/2005 | Suzuki | .......................... | 250/205 |
| 7,813,392 B2 * | 10/2010 | Li et al. | ........................ | 372/38.02 |
| 8,145,067 B2 * | 3/2012 | Nagayama et al. | ............ | 398/195 |
| 8,184,985 B2 * | 5/2012 | Kondo et al. | ................. | 398/138 |
| 2003/0152390 A1 * | 8/2003 | Stewart et al. | ................. | 398/135 |
| 2003/0235415 A1 * | 12/2003 | Peters et al. | ................... | 398/197 |
| 2004/0067006 A1 * | 4/2004 | Welch et al. | ..................... | 385/14 |
| 2006/0002718 A1 | 1/2006 | Matsui et al. | | |
| 2006/0291510 A1 * | 12/2006 | Juluri | ........................ | 372/29.021 |
| 2007/0008665 A1 * | 1/2007 | Moyer et al. | ..................... | 361/42 |
| 2007/0160374 A1 * | 7/2007 | Matsui et al. | ................. | 398/195 |
| 2007/0195477 A1 * | 8/2007 | Brosnan | ........................ | 361/93.1 |
| 2007/0253454 A1 * | 11/2007 | Gustavson et al. | ......... | 372/38.07 |
| 2010/0322274 A1 * | 12/2010 | Li et al. | ........................ | 372/38.02 |
| 2011/0085793 A1 * | 4/2011 | Oomori | ............................ | 398/22 |

FOREIGN PATENT DOCUMENTS

| | | | |
|---|---|---|---|
| JP | 06-037374 | | 2/1994 |
| JP | 06037374 A | * | 2/1994 |
| JP | 2007-316226 | | 12/2007 |

OTHER PUBLICATIONS

Cole, C. et al. "100GbE-Optical LAN Technologies," IEEE Applications & Practice, vol. 45 (12), pp. 12-19, (2007).

* cited by examiner

*Primary Examiner* — Ken Vanderpuye
*Assistant Examiner* — Amritbir Sandhu
(74) *Attorney, Agent, or Firm* — Venable LLP; Michael A. Sartori; Tamatane J. Aga

(57) ABSTRACT

An optical transceiver is disclosed in which the optical output thereof is controlled without degrading the signal quality. The optical transceiver of the invention includes a plurality of transmitter units and a controller that adjusts the bias current of respective transmitter units. The controller, receiving information to decrease/increase the output of the optical transceiver, decides a unique unit that has a largest margin to increase/decrease the bias current and provides a control signal only to the unique unit to increase/decrease the bias current.

12 Claims, 3 Drawing Sheets

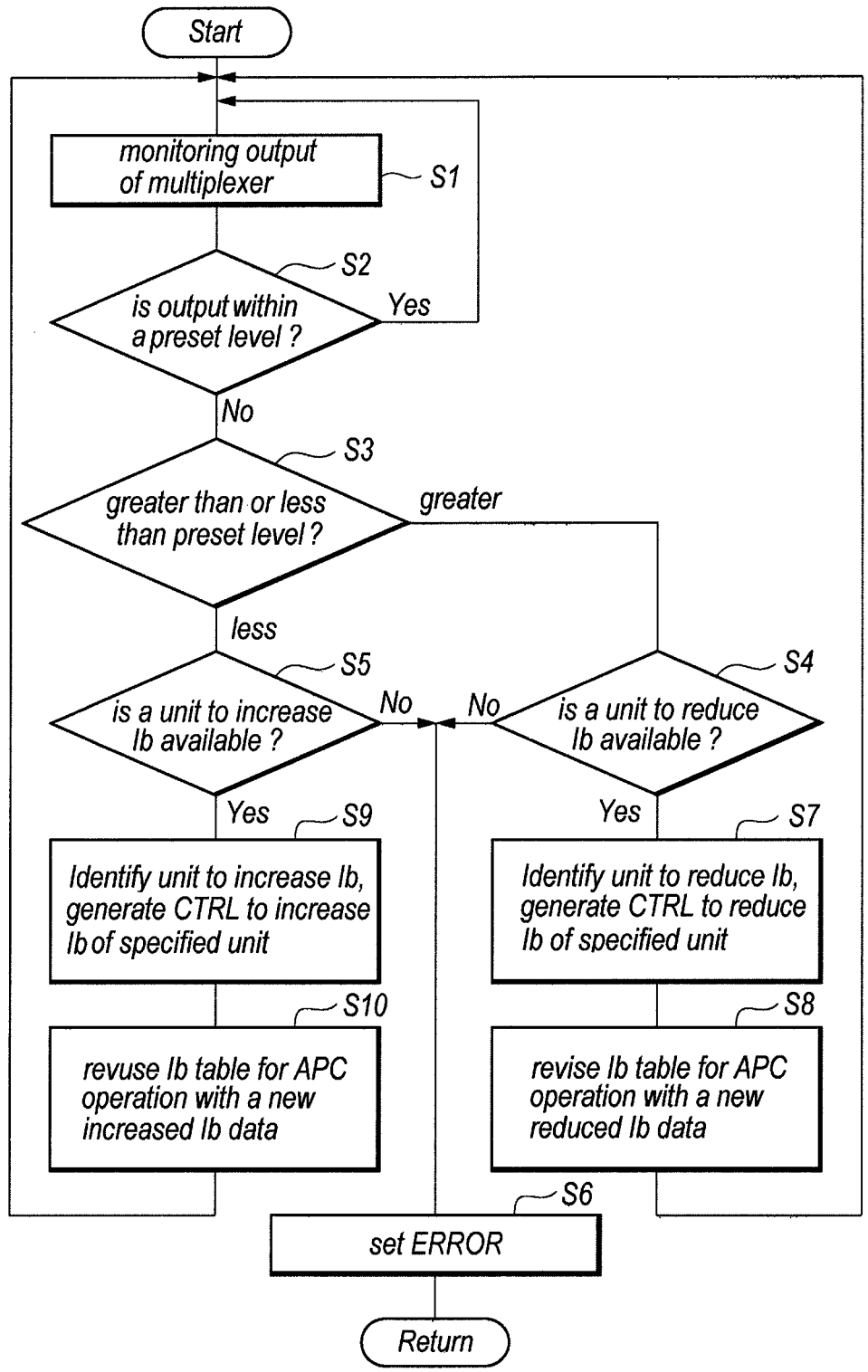

2

OPTICAL TRANSCEIVER INCLUDING A PLURALITY OF TRANSMITTER UNITS AND A PROCESS TO CONTROL THE SAME

BACKGROUND OF THE INVENTION

1. Field of the Invention

The present invention relates to an optical transceiver that receives and transmits optical signals.

2. Related Prior Arts

The standardization for the 100 Giga-bit Ethernet (Trademark, hereafter denoted as 100 GbE) has been executed in an IEEE committee. Cole et al. has disclosed in IEEE communication society, vol. 45(12), pages from 12 to 19, titled by "100 GbE-optical LAN Technologies", one type of optical transceivers applicable to such 100 Giga-bit Ethernet. The 100 GbE multiplexes four (4) channels each having a specific wavelength with 800 GHz span and a transmission speed of 25 giga-bit per second (hereafter Gbps). The optical transceiver applicable to the 100 GbE installs four (4) transmitter units and a wavelength multiplexer and/or four (4) receiver units and a wavelength de-multiplexer. Each transmitter unit emits an optical signal with the wavelength thereof defined by the IEEE standard, and four optical signals are multiplexed by the optical multiplexer. The optical transceiver disclosed in the prior art above mentioned provides monitor photodiodes in respective transmitter units to monitor the optical output of respective units. A Japanese patent application published as JP-2007-316226A has disclosed an optical transceiver that installs an optical multiplexer. The United States patent application published as US-2006-002718A and another Japanese patent application published as JP-H06-037374A have disclosed an optical module installing a laser diode (hereafter denoted as LD), in which the optical output of the LD is monitored by the monitor PD and the magnitude of the optical output is controlled based on the monitoring result.

The optical output from the optical transceiver installing a plurality of transmitter units is multiplexed with the optical signals of respective transmitter units. It is hard to maintain the optical output of the transceiver by monitoring respective outputs of the transmitter units because, for instance, when the multiplexer causes optical loss, the monitor photodiode arranged in respective transmitter units never detects the failure or the degradation of devices arranged in the downstream of the photodiode. The present application provides an optical transceiver that enables to control the optical output thereof without causing the degradation of the optical signal.

SUMMARY OF THE INVENTION

One aspect of the present invention relates to an optical transceiver that comprises a plurality of transmitter units, and optical multiplexer and a controller. Each transmitter unit includes a semiconductor laser diode (hereafter denoted as LD) and a bias current source. The LD is provided with a bias current from the bias current source. The multiplexer multiplexes optical signal each output from the transmitter unit. The controller may control the optical output of the optical transceiver such that, when the controller receives information to increase or to decrease the optical output of the transceiver, the controller identifies one of the transmitter units that has a widest margin of the bias current and provides a control signal to the bias current source of the identified transmitter units to increase or to decrease the bias current by a preset step.

The controller of the invention may generate an ERROR directed to the device provided in the upstream of the transceiver units when none of the transmitter units has the margin to increase or to decrease the bias current by the preset level. The information provided to the controller may be output from a monitor photodiode that monitors an output of the optical multiplexer. The margin of the bias current may be a difference of the bias current currently provided to the LD and an upper limit of the bias current which is determined by the standard concerning to the eye safety, or may be a difference of the bias current currently provided to he LD and a lower limit which is determined by a condition where the LD shows a relaxation frequency applicable to the transmission speed of the optical transceiver.

The optical transceiver of the invention may further provide a memory that stores a bias current currently provided to respective LD in the transmitter unit. When the controller creates a command to increase or to decrease the bias current of the specific transmitter units that has the widest margin of the bias current, the controller concurrently revises the memory so as to store a new bias current of the specific transmitter unit, which is increased by a preset increasing step or decreased by a preset decreasing step for the bias current currently provided to the LD.

Another aspect of the invention relates to a process to control the optical output of the optical transceiver that installs a plurality of transmitter units, an optical multiplexer and a controller. The process of the invention may includes steps of: (a) deciding an increasing margin of a bias current provided to the LD from the bias current source in the transmitter unit when the controller receives information to increase the optical output of the optical transceiver, or a decreasing margin when the controller receives information to decrease the optical output; (b) identifying one of the transmitter units that has the widest increasing margin or the widest decreasing margin of the bias current; and (c) providing a control signal to the identified transmitter unit so as to increase or to decrease the bias current provided to the LD by a preset increasing step or a preset decreasing step.

The increasing margin may be given by a difference between the bias current currently provided to the LD and an upper limit of the bias current which is determined by a standard concerning to an eye-safety. The decreasing margin may be given by a difference between the bias current currently provided to the LD and a lower limit of the bias current which is determined by a condition where the LD shows a relaxation frequency applicable to the transmission speed of the optical transceiver. Moreover, the controller may assert an ERROR when the widest increasing margin and the widest decreasing margin of the bias current is less than the preset increasing step and the preset decreasing step.

BRIEF DESCRIPTION OF THE DRAWINGS

The foregoing and other purposes, aspects and advantages will be better understood from the following detailed description of a preferred embodiment of the invention with reference to the drawings, in which:

FIG. 3 shows a flow chart performed in the power adjustor.

DETAILED DESCRIPTION OF PREFERRED EMBODIMENTS

Figure 1:
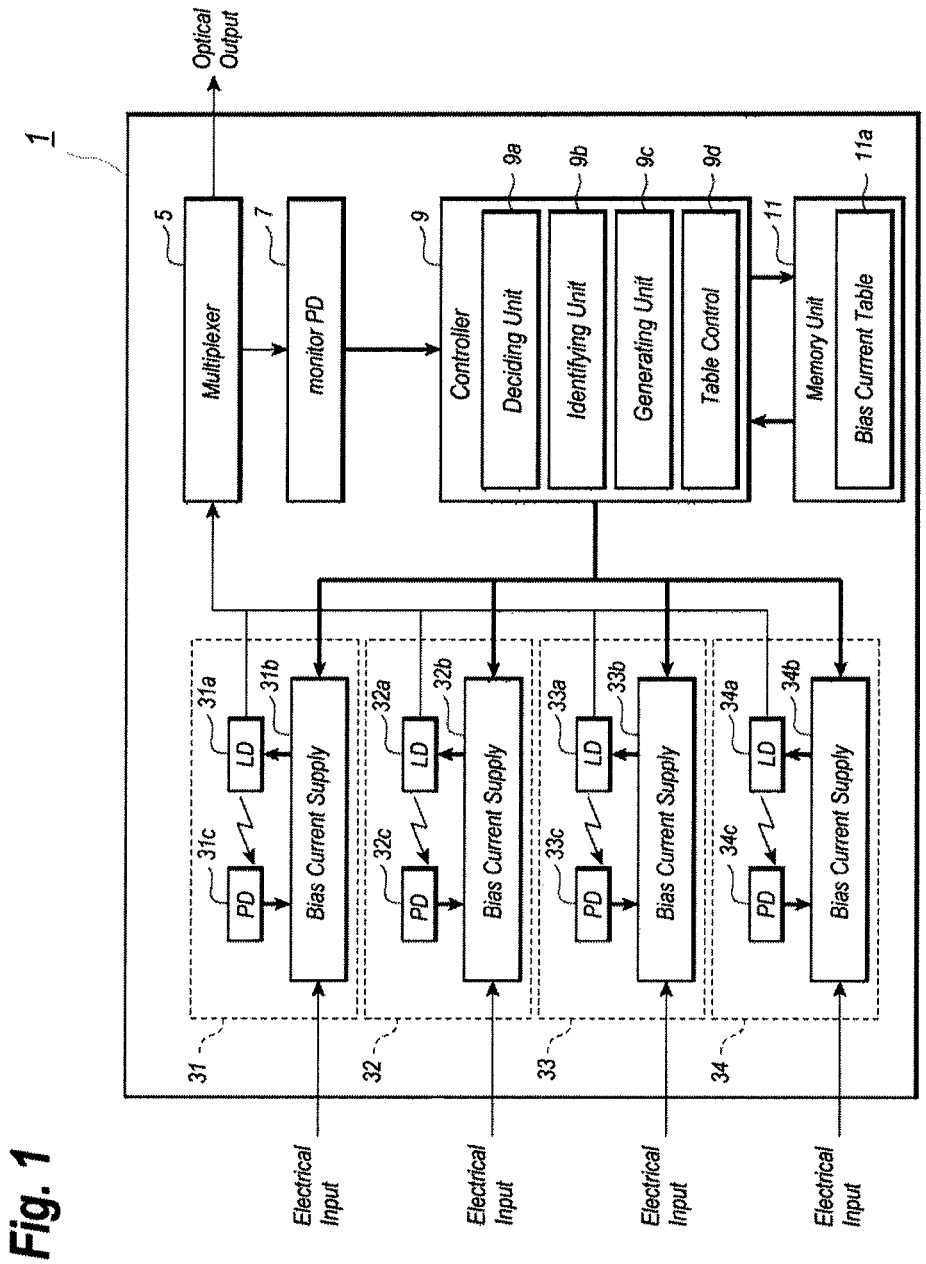
FIG. 1 shows a functional block diagram of an optical transceiver according to an embodiment of the present invention.

Next, some preferred embodiments according to the present invention will be described as referring to accompanying drawings. In the description of the drawings, the same element will be referred by the same numerals or the symbols without overlapping explanations. An optical transceiver according to the present embodiment comprises a transmitter section 1 and a receiver second. The transmitter section 1 externally transmits optical signal which is converted from an electrical signal, while, the receiver section, which is not illustrated in the figures, receives an optical signal and converts this optical signal into a corresponding optical signal. The optical transceiver shown in the figures may be applicable to the Ethernet (a registered trademark) with the 100 Gbps transmission speed. FIG. 1 illustrates the block diagram of the transmitter section 1, which includes four transmitter units, 31 to 34, an optical multiplexer 5, a monitoring photodiode (PD) 7, a controller 9 and a memory unit 11.

The unit 31 includes an LD 31a, a current source 31b and a local photodiode (hereafter denoted as PD) 31c. The LD 31a emits signal light provided with a bias current and a modulation current each supplied from the current source 31b. In the present embodiment, the LD may have a type of the distributed feed-back laser diode (DFB-LD). The current source 31b may convert an electrical signal provided from the upstream device, which is not shown in FIG. 1, into the modulation current, and supplies this modulation current concurrently with the bias current to the LD 31a. The signal light emitted from the LD 31a reflects the electrical signal input to the current source 31b and is provided to the optical multiplexer 5 through an optical fiber. The local PD 31c monitors a portion of the signal light; specifically, the local PD 31c may monitor the back facet light emitted from the back facet of the LD 31a, and provides a monitoring signal corresponding to the magnitude of the back facet light to the current source 31b. The current source 31b may adjust the bias current based on the operation of, what is called, the auto-power control (APC), by the monitoring signal provided from the local PD 31c and further on the control signal output from the controller 9. The LD 31a may be a type of the DFB-LD integrated with an Electro-Absorption (EA) modulator. In this case, the electrical signal coming from the upstream device of the current source 31b is provided to the EA unit of the EA-DFB; while, the bias current supplied to the LD is a DC current. Other transmitter units, 32 to 34, may have the same arrangement with those of the first transmitter unit 31. The unit 32 includes an LD 32a, a current source 32b and a local PD 33c; and units 33 and 34 have the same arrangement.

The optical multiplexer 5 multiplexes signal light coming from respective transmitter units, 31 to 34, and outputs the multiplexed light out of the optical transmitter section 1. The monitor PD 7 is a PD to monitor a portion of the multiplexed light output from optical multiplexer 5. The output of the monitor PD 7 may be provided to the controller 9.

The controller 9 is configured to receive the output of the monitor PD 7, and to generate a control signal to adjust the bias current of the LD, 31a to 34a, based on the monitoring signal and bias current table 11a set in the memory unit 11. The controller 9 further carries out an operation to access the table 11a in the memory unit 11.

The memory unit 11, which is a type of the random access memory (RAM) able to write and read data therein and therefrom, in particular, the memory unit 11 includes the bias current table 11a for the bias current. Specifically, the table 11a stores values of the bias current currently provided to respective LDs, 31a to 34a, which are set by the APC loop; and those of the range of the bias current able to be supplied to the LDs, 31a to 34a. These values are stored in connection with respective transmitter units, 31 to 34. The lower limit of the bias current corresponds to a current necessary to obtain the relaxation oscillation with a frequency about 16 GHz which secures the transmission quality in the range of 25 Gbps. This lower limit of the bias current depends on individual LDs, 31a to 34a, because not only the frequency itself of the relaxation oscillation depends on the bias current, and the dependence of the frequency on the current scatters in respective LDs. Thus, the bias current at which the frequency of the relaxation oscillation becomes 16 GHz scatters in respective LDs, 31a to 34a. In a case of the EA-DFB, the lower limit of the bias current may be set by the current at which the LD emits light with the minimum power determined by the IEEE standard. The bias current thus determined also depends on respective LDs, 31a to 34a. The upper limit provided to the LD reflects the value decided by the IEEE standard from the viewpoint of the eye safety.

The controller 9 will be further described. The controller 9 comprises a CPU (Central Processing Unit), a ROM (Read Only Memory), a RAM (Random Access Memory), and a communication peripheral, where these units are not explicitly illustrated in FIG. 1 and are coupled with each other through an internal bus. The CPU carries out the operation to control the optical output of the transmitter section 1 according to a program stored in the ROM or RAM. The communication peripheral includes an interface to receive a signal coming from the monitor PD 7, that to communicate with the memory unit 11 to read/write data in the bias current table 11a, and that to provide a control signal to the current sources, 31b to 34b, in respective transmitter units, 31 to 34.

The controller 9 functionally comprises a deciding unit 9a, a identifying unit 9b, a generating unit 9c, and a table control 9d as shown in FIG. 1. The functions reflected in these units, 9a to 9d, may be performed by the CPU under the execution of the program, that is, the CPU in the controller 9 executes the process shown in FIG. 3 using the units, 9a to 9d.

The deciding unit 9a monitors the optical output of the transmitter section 1, which is provided from the multiplexer 5 and monitored by the monitor PD 7. The deciding unit 9a decides whether the optical output is within a preset range or not, in other words, the deciding unit 9a decides the output power exceeds the upper limit or is less than the lower limit.

When the output power is less than the lower limit, the identifying unit 9b identifies the LD that has a widest margin between the bias current currently flowing therein by the APC operation and the upper limit thereof, where both parameters are stored in the bias current table 11a. On the other hand, when the output power of the transmitter section 1 is greater than the upper limit, the identifying unit 9b identifies the LD that has the widest margin between the bias current currently provided there to and the lower limit thereof.

Figure 2A:
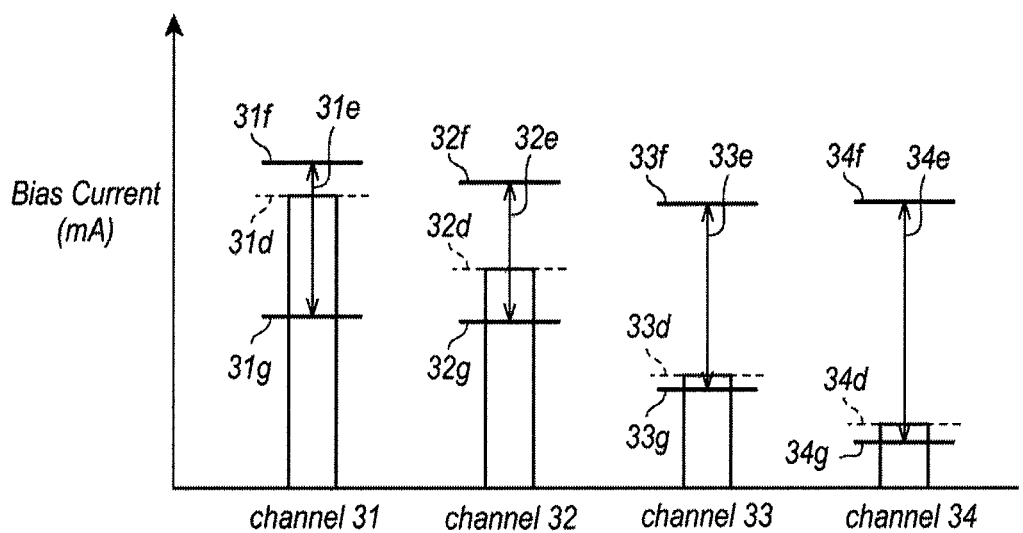
FIG. 2A schematically shows an example of the current flowing, the upper limit, and the lower limit of the bias current in respective channels.
Figure 2B:
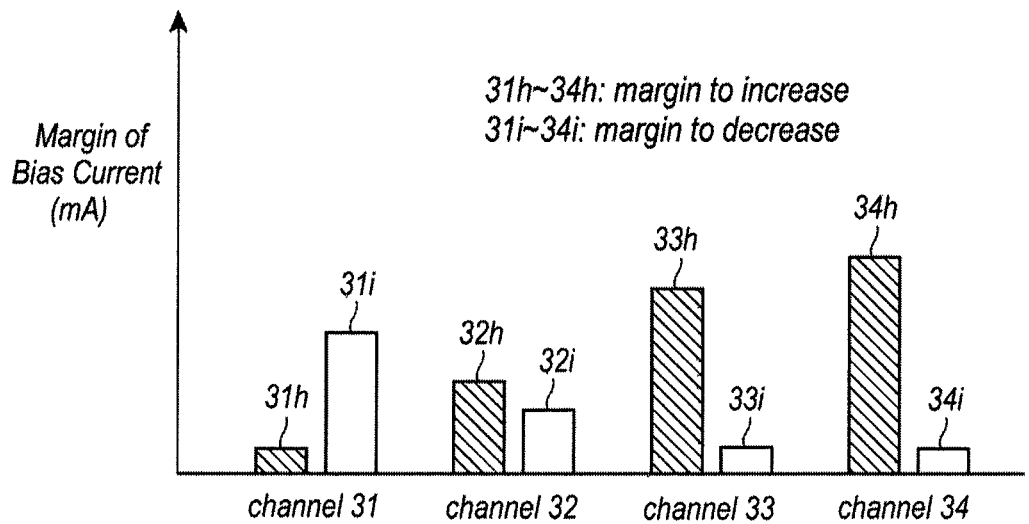
FIG. 2B shows a margin to increase and a margin to decrease the bias current in respective channels.

FIG. 2A shows an example of the bias current currently provided and the preset ranges thereof mentioned above, while, FIG. 2B shows margins for increasing and decreasing of the bias current. The vertical axis in FIG. 2A corresponds to the bias current currently provided to the LD, while, the axis in FIG. 2B denotes the margin of the bias current. In the transmitter unit 31, the bias current currently provided is the level 31d, while, the range 31e able to be supplied thereto is given by a difference between the upper level 31f and the lower level 31g. Accordingly, the margin for increasing the bias current becomes a difference between the levels, 31f and 31d, and that for decreasing the current becomes a difference between the levels, 31d and 31g. In the unit 32, the bias current currently provided is defined by the level 32d, the range of the bias current able to be supplied to the LD 32a is given by the arrow 32e; accordingly, the increasing margin of the bias current is given between the levels, 32f and 32d, and the decreasing margin is given between the levels, 32d and 32g. The same explanations and the definitions may be applicable for rest two units, 33 and 34.

Referring to FIG. 1 again, the identifying unit 9b will assert the ERROR when a difference between the bias current currently provided and the upper limit of the bias current is less than a preset increasing step for every LDs, 31a to 34a, or when a difference between the bias current currently provided and the lower limit thereof is less than a preset decreasing step for every LDs, 31a to 34a. This ERROR is provided to the upstream device of the transmitter section 1 through the peripheral. The bias current currently provided in each LD, the upper and lower limits thereof for each LD, and the preset increasing and decreasing steps are stored in the table 11a.

The generating unit 9c generates a control signal to one of the current sources, 31b to 34b, which is identified by the identifying unit 9b. Specifically, the generating unit 9c, when the deciding unit 9a decides the optical output is less then the preset lower limit, generates a control signal to increase the bias current of the specific unit by the preset increasing step; while, the generating unit 9c outputs another control signal to the specific unit identified by the identifying unit 9b when the deciding unit 9a decides the optical output exceeds the upper limit.

The table control 9d revises the bias current table 11a which stores the bias current currently provided to the specific LD identified by the identifying unit 9b, when the controller 9 changes the bias current output from the specific current source, 31b to 34b.

The operation of the transmitter unit 1 will be described as referring to FIG. 3. The deciding unit 9a first monitors the output of the multiplexer 5 through the monitor PD 7 at step S1. The deciding unit 9a decides whether the optical power output from the multiplexer 5 is in the preset range or not at step S2. When the output power is in the preset range, which corresponds to the branch "Yes" in step S2; the operation of the transmitter unit 1 will be resumed from step S1. On the other hand, when the optical output power is outside of the preset range, which corresponds to the branch "No" in step S2; the deciding unit 9a further decides whether the optical output exceeds the upper limit or is less than the lower limit at step S3. When the output power exceeds the upper limit, the procedure advances to step S4, while, when the output power is less than the lower limit, the procedure advances to step S5.

In step S4 or S5, the identifying unit 9b first calculates the current increasing margin, 31h to 34h, and the current decreasing margin 31i to 34i for the bias current based on the bias current, 31d to 34d, currently provided and the preset range, 31e to 34e, of the bias current for respective transmitter units, 31 to 34. These data are stored in the bias current table 11a.

At step S4, the identifying unit 9b decides whether at least one of the units, 31 to 34, exits or not, in which the bias current thereof may be decreased. That is, at least one of the units, 31 to 34, has the current decreasing margin greater than the preset decreasing step. When no channel is left where the bias current may be decreased, that is, the current decreasing margins, 31i to 34i, are all less than the preset decreasing step, which corresponds to the branch "No" in step S4, the controller 9 asserts the ERROR and sends this ERROR to the upstream device of the transmitter unit 1 through the communication peripheral at step S5. When at least one unit exists where the bias current may be decreased by the preset decreasing step, which corresponds to the branch "Yes" in step S4; the process advances to step S7.

In step S5, the identifying unit 9b decides whether at least one unit among units, 31 to 34, exists or not where the unit has a margin to increase the bias current thereof. That is, the identifying unit 9b scans all margins, 31h to 34h of the units, and finds at least one unit has a margin to increase the bias current. When no unit has the increasing margin, which corresponds to the branch "No" in step S5, the controller 9 asserts the ERROR and transmits this ERROR to the device provided in the upstream of the transmitter unit 1 at step S6. On the other hand, when at least one channel has the increasing margin, which corresponds to the branch "Yes", the identifying unit 9b performs the procedure S9.

In step S7, the generating unit 9c decides an unique unit which has the largest margin to decrease the bias current among the units which have an available margin, and generates a control signal to decrease the bias current by the preset decreasing step and transmits this control signal to the unique unit. Subsequently, the table control 9d calculates the new bias current of the unique unit and rewrites the data in the bias current table 11a for the APC operation at step S8. The process of the controller 9 is resumed at step S1. Further specifically, when all units, 31 to 34, have the margin to decrease the bias current greater than the preset decreasing level, the generating unit 9c decides the unit 31 that has the largest margin 31i to decrease the bias current, generates the control signal to decrease the bias current by the preset step, and provides this control signal to the bias current source 31b of the unit 31. Then, the table control 9d calculates the new bias current of the unit 31 which is decreased by the preset decreasing step, and revises the data in the bias current table 11a for the APC operation of the channel 31 in step S8.

In step S9, the generating unit 9c decides the unique unit that shows the largest margin among units which have respective increasing margin of the bias current, creates the control signal to increase the bias current of this unique unit by the preset increasing step, and provides this control signal to the bias current source of the unique unit. Then, the table control 9d calculates the new bias current of the unique unit which is increased by the preset increasing step, revises the data stored in the bias current table 11a for the APC operation of the unique unit at step S10, and returns the procedure of the controller 9 to step S1. Further specifically explaining as referring to FIG. 2B, when all units, 31 to 34, have respective margin larger than the preset increasing step, the generating unit 9c selects the unique unit 34 that has the largest margin to increase the bias current at step S9, calculates the new bias current increased by the preset increasing step, and provides the control signal to the bias current source 34b of the unique unit 34. Then, the table control 9d revises the data for the APC operation of the unique unit 34, which stored in the bias current table 11a, to increase by the preset increasing step at step S10.

Thus, the transmitter section 1 increases the bias current of the unique transmitter unit that has the largest margin to increase the bias current when the transmitter section 1 receives the information to increase the optical output, and decreases the current of the unique transmitter unit that has the largest margin to decreases the bias current when the transmitter section 1 receives the information to decrease the optical output thereof. In a case when all transmitter units are to be evenly increased in the bias current thereof, some units exceed the upper limit of the bias current, which degrades the quality of the optical signal to be transmitted. On the other hand, the transmitter section 1 according to the present embodiment, the controller 9 controls the bias current of the unique unit that has the widest margin to increase or to decrease the bias current; accordingly, any extraordinary conditions where the bias current greater that the upper limit or less than the lower limit is provided to the transmitter unit may be prevented.

Moreover, when all units have the margin less than the preset increasing step or the decreasing step, the ERROR is asserted for the device provided in the upstream of the transmitter section 1, the extraordinary bias current may be prevented to be provided to any units, 31 to 34. Because the control of the bias current of respective units is carried out by the preset level, all units, 31 to 34, may be evenly adjusted in the output thereof.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

I claim:

1. An optical transceiver comprising:
a plurality of transmitter units each installing a semiconductor laser diode and a bias current source, said semiconductor laser diode being provided with a bias current from said bias current source;
an optical multiplexer configured to multiplex optical signals output from respective transmitter units;
a monitor photodiode configured to monitor an optical output of said optical transceiver, and
a controller to control said optical output,
wherein said controller selects one of transmitter units that has a margin of said bias current widest to a predetermined upper limit or a predetermined lower limit when said controller receives information from said monitor photodiode to increase or decrease said optical output, and provides a control signal to said bias current source in said one of transmitter units, and
wherein said bias current source in said one of transmitter units increases or decreases said bias current by a preset step.

2. The optical transceiver of claim 1,
wherein said controller asserts an ERROR when said widest margin of said bias current is less than said preset step.

3. The optical transceiver of claim 1,
wherein said margins in said respective transmitter units are each given by a difference between said bias current currently provided to said laser diode and said lower limit which is determined by a condition where said laser diode shows a relaxation frequency applicable to a transmission speed of said optical transceiver.

4. The optical transceiver of claim 1,
wherein said margins in said respective transmitter units are each given by a difference between said bias current currently provided to said laser diode and said upper limit which is determined by a standard concerning to eye-safety.

5. The optical transceiver of claim 1,
further comprising a memory implementing with a bias current table that stores said bias current currently provided to said laser diode, said upper limit of said bias current and said lower limit of said bias current for respective transmitter units,
wherein each of said upper limits is determined by a standard concerning to eye-safety and each of said lower limits is determined by a condition where said laser diode shows a relaxation frequency applicable to a transmission speed of said optical transceiver.

6. The optical transceiver of claim 1,
wherein each of said transmitter units further includes a local photodiode to monitor an optical output of said laser diode, and
wherein said laser diode, said bias current source, and said local photodiode in respective transmitter units constitute an automatic power control circuit to maintain said optical output of said laser diode in constant.

7. The optical transceiver of claim 6,
wherein each of said laser diodes is a type of a distributed feedback laser diode directly driven by an electrical signal.

8. A process to control an optical output of an optical transceiver that installs a plurality of transmitter units each including a laser diode and a bias current source, an optical multiplexer configured to multiplex optical signals each output from said transmitter unit to generate said optical output, a monitor photodiode to detect said optical output, and a controller, said process comprising steps of:
deciding an increasing margin of a bias current provided to said laser diode from said bias current source for respective transmitter units when said controller receives information from said monitor photodiode to increase said optical output of said optical transceiver, or a decreasing margin for respective transmitter units when said controller receives information from said monitor photodiode to decrease said optical output of said optical transceiver;
identifying one of said transmitter units that has a widest increasing margin or a widest decreasing margin of said bias current; and
providing a control signal to said one of transmitter units so as to increase or to decrease said bias current provided to said laser diode by a preset increasing step or a preset decreasing step.

9. The process of claim 8,
wherein said increasing margins of said respective transmitter units are given by a difference between said bias current currently provided to said laser diode and an upper limit of said bias current determined by a standard concerning to an eye-safety.

10. The process of claim 8,
wherein said decreasing margins of said respective transmitter units are given by a difference between said bias current currently provided to said laser diode and a lower limit of said bias current determined by a condition where said laser diode shows a relaxation frequency applicable to a transmission speed of said optical transceiver.

11. The process of claim 8,
further comprising a step of asserting an ERROR when said all of said increasing margins and all of said decreasing margins of said bias current are less than said increasing step and said decreasing step, respectively.

12. The process of claim 8,
wherein said optical transceiver further installs a memory that stores said bias current of respective transmitter units, and
wherein said process further comprises a step of revising said bias current stored in said memory by a bias current increased or decreased by said increasing step or said decreasing step, respectively.

* * * * *